UNITED STATES PATENT OFFICE.

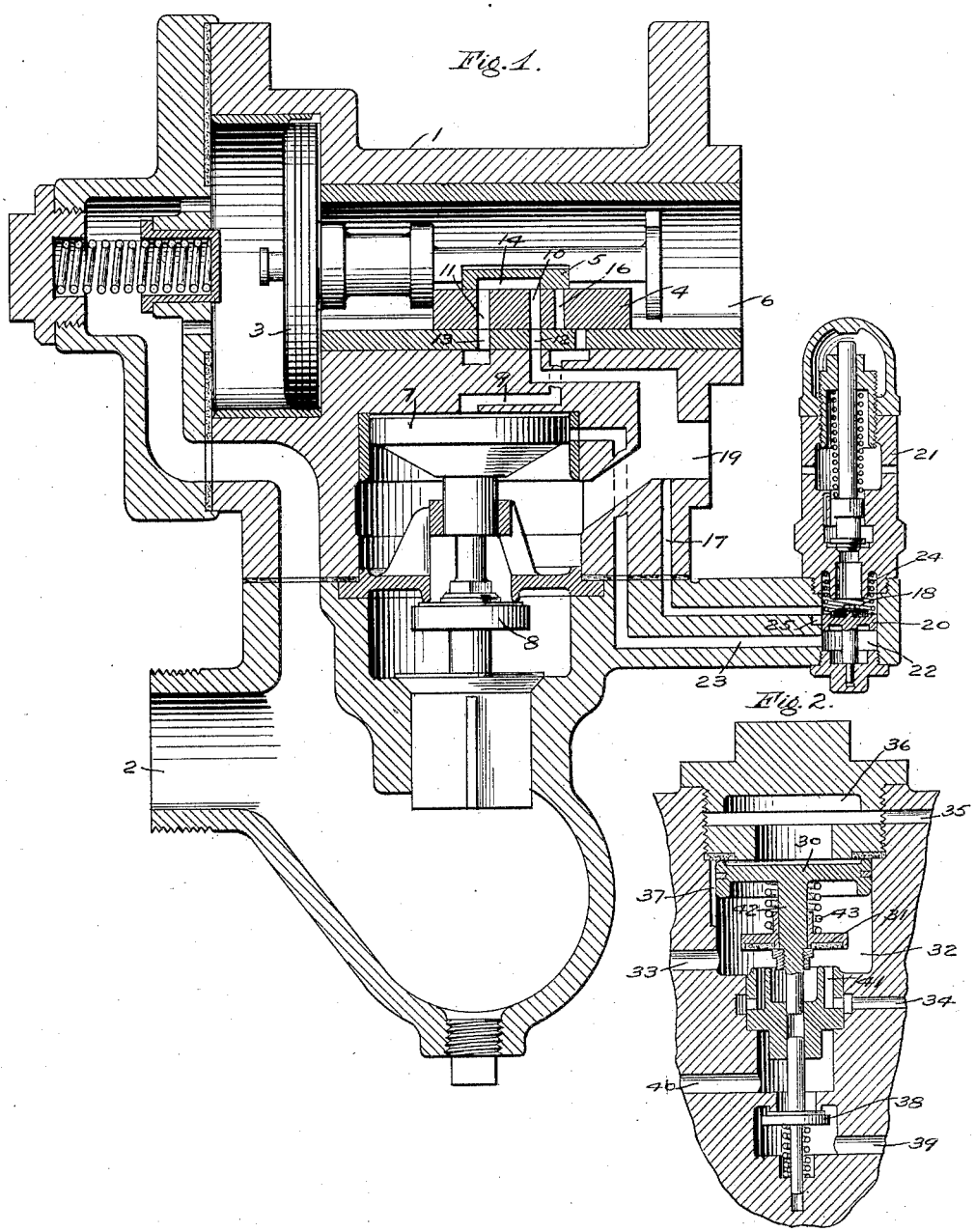

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

FLUID-PRESSURE BRAKE.

1,076,723.   Specification of Letters Patent.   Patented Oct. 28, 1913.

Application filed June 19, 1909. Serial No. 503,125.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to means for controlling an outlet from the brake cylinder through a blow down valve to the atmosphere in applying the brakes.

In a prior application, Serial No. 369,027, filed April 16, 1907, I have disclosed means operated by variations in train pipe pressure, preferably the triple valve device, for controlling the outlet from the brake cylinder, and adapted in ordinary service applications to open the outlet passage, but in emergency applications to close said outlet passage.

The principal object of my present invention is to provide a valve means separate from the triple valve for controlling the brake cylinder outlet through the blow-down valve.

In the accompanying drawing, Figure 1 is a sectional view of a triple valve device and blow down valve attached thereto embodying my improvement; and Fig. 2 a fragmentary sectional view of a modified construction embodying my invention.

According to Fig. 1 of the drawing, the triple valve device may be of the usual construction comprising a casing 1, having a train pipe connection 2, piston 3, main slide valve 4 and graduating valve 5, the valve chamber 6 being open to the auxiliary reservoir in the usual manner. The triple valve shown is also provided with an emergency piston 7 for controlling the usual train pipe vent valve 8 adapted to vent air from the train pipe to the brake cylinder in an emergency application of the brakes. Emergency port 9 leads from the main slide valve seat to the chamber above the emergency piston 7 and the main slide valve is provided with ports 10 and 11 for respectively registering with the brake cylinder port 12 and exhaust port 13 in release position, when cavity 14 in the graduating valve 5 connects said ports. The main slide valve also has the usual service port 16. According to my improvement, a port 17 in the casing 1, leading from the brake cylinder passage 19, is adapted to communicate with a chamber 18 containing valve piston 20 which controls communication from passage 17 to chamber 18 communicating with a safety valve device 21, of any desired construction. The chamber 22 at the opposite side of the valve piston 20 is open to a passage 23 leading to the emergency piston 7, and so positioned that the same is normally closed by said piston, but is open to the chamber above the piston upon movement of same in an emergency application of the brakes. Normally, a spring 24 maintains the valve piston 20 in position with communication open from the brake cylinder passage 17 to the safety valve 21, so that in service applications of the brakes, the fluid under pressure in the brake cylinder is free to flow to the safety valve and the same operates to blow off the pressure in excess of the predetermined degree at which the safety valve is adjusted. In an emergency application, however, the triple valve piston moves out to emergency position and opens the emergency port 9 to the auxiliary reservoir, so that fluid therefrom flows to and operates the emergency piston 7 in the usual manner. The movement of the emergency piston 7 opens up communication from port 9 to passage 23, thus permitting fluid to flow from the auxiliary reservoir through passage 23 to chamber 22. The valve piston 20 is thereby shifted and closes the communication from brake cylinder passage 17 to the safety valve. In this position communication is also opened from passage 23 to passage 17, a port extension 25 of the passage 17 being provided for that purpose. Fluid from the auxiliary reservoir may thus flow from the passage 23 through passage 17 to the brake cylinder, to effect an emergency application of the brakes. In its seated position, closing communication to the safety valve, the valve piston 20 is subject to the pressure in the brake cylinder on its outer face and is thereby held in said position, until the brakes are released, when, the brake cylinder pressure having been exhausted to the atmosphere, the spring 24 will return the valve piston 20 to its normal open position.

In Fig. 2 of the drawing another construction embodying my improvement is illustrated in which a piston 30 is provided and a valve 31 operated thereby for controlling communication from chamber 32, having a passage 33 leading to the brake cylinder, to passage 34, in open communication with the safety valve. A passage 35 leads from the chamber 36 above the piston 30 to the seat of the triple valve slide valve and said passage is adapted to be connected in release and service application positions with the exhaust port, while in emergency applications the same is opened to the auxiliary reservoir. It will now be evident that in service applications, air from the brake cylinder has free access to the safety valve by way of passages 33 and 34, while in emergency applications, the admission of fluid under pressure from the auxiliary reservoir to the piston 30 operates the same to close the valve 31 and cut off communication from the brake cylinder to the safety valve. A port 37 is provided around piston 30, so that when said piston is shifted from its seat in an emergency application, communication is opened from chamber 36 to chamber 32 and fluid from the auxiliary reservoir is thereby admitted to the brake cylinder by way of the passage 33. If desired, the movement of piston 30 in emergency applications may be employed to operate a by-pass valve 38, adapted to open communication from a passage 39 leading to a supplementary reservoir or other additional source of pressure to a passage 40, connected with the auxiliary reservoir.

In order to insure the tight and uniform seating of the valve 31, the same may be constructed as shown in the drawing, the port opening 41 to the safety valve port 34 being inclosed between annular seating rings upon which the valve 31 is adapted to seat. The valve 31 is loosely mounted on the valve stem 42 and a pressure spring 43 is interposed between the piston 30 and the valve 31, so that said valve is adapted to yieldingly adjust itself to its seat, as will be apparent.

Having now described my invention, what I claim as new and desire to secure by Letters Patent, is:—

1. In a fluid pressure brake, the combination with a blow down valve, of a valve piston for controlling the outlet from the brake cylinder through said blow down valve, and normally maintaining said outlet open and means subject to variations in train pipe pressure for supplying fluid under pressure to one side of said valve piston to cut off the communication through said blow down valve.

2. In a fluid pressure brake, the combination with a triple valve device subject to variations in train pipe pressure, of a blow down valve and a piston normally subject on one side to brake cylinder pressure and valve means operated thereby for controlling the outlet from the brake cylinder through said blow down valve, a spring normally maintaining said piston and valve means open and means operated by said triple valve device for admitting fluid under pressure to the opposite side of said piston to operate same and thereby said valve means to close the communication from the brake cylinder through said blow down valve.

3. In a fluid pressure brake, the combination with a triple valve device for controlling the supply of air to the brake cylinder, of a blow down valve and means operated by the flow of air from the auxiliary reservoir to the brake cylinder for closing communication from the brake cylinder through said blow down valve.

4. In a fluid pressure brake, the combination with a triple valve device for controlling the supply of air to the brake cylinder, of a blow down valve and means for controlling the outlet from the brake cylinder through said blow down valve and operated by the flow of air from the auxiliary reservoir to the brake cylinder in an emergency application for closing said outlet.

5. In a fluid pressure brake, the combination with a triple valve device having an emergency valve mechanism operated by fluid from the auxiliary reservoir for opening a train pipe vent port in an emergency application of the brakes, of a blow down valve normally open to the brake cylinder and a valve piston operated by the flow of auxiliary reservoir fluid from the emergency piston to the brake cylinder for closing communication from the brake cylinder through said blow down valve.

In testimony whereof I have hereunto set my hand.

WALTER V. TURNER.

Witnesses:
Wm. M. Cady,
A. M. Clements.

---

Copies of this patent may be obtained for five cents each, by addressing the "Commissioner of Patents, Washington, D. C."